US009883435B2

(12) United States Patent
Ohlarik et al.

(10) Patent No.: US 9,883,435 B2
(45) Date of Patent: Jan. 30, 2018

(54) SOFT HANDOVER FOR A VOICE OVER INTERNET PROTOCOL SERVICE

(71) Applicant: Verizon Patent and Licensing Inc., Arlington, VA (US)

(72) Inventors: Derek Wade Ohlarik, Flemington, NJ (US); Mauricio Pati Caldeira de Andrada, South Plainfield, NJ (US); David B. Murray, Fanwood, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/045,618

(22) Filed: Feb. 17, 2016

(65) Prior Publication Data
US 2017/0238220 A1   Aug. 17, 2017

(51) Int. Cl.
*H04W 36/08* (2009.01)
*H04W 36/30* (2009.01)
*H04W 36/18* (2009.01)

(52) U.S. Cl.
CPC ........... *H04W 36/08* (2013.01); *H04W 36/18* (2013.01); *H04W 36/30* (2013.01)

(58) Field of Classification Search
CPC ... H04W 12/061; H04W 60/00; H04W 60/04; H04W 8/04; H04W 8/26; H04W 36/0083; H04W 36/08; H04W 36/18; H04W 36/30; H04W 36/32; H04W 36/12; H04W 36/14; H04W 52/40; H04W 16/06; H04W 16/32; H04W 88/06; H04W 36/04; H04W 36/00; H04W 36/0005; H04W 36/0016; H04W 36/0094; H04W 84/045; H04W 92/02; H04B 7/2606; H04B 7/18541; H04L 47/767; H04L 1/0002; H04L 1/20
USPC ..... 455/435.1, 437, 442, 443, 444; 370/331, 370/332
See application file for complete search history.

(56) References Cited

U.S. PATENT DOCUMENTS

| | | | |
|---|---|---|---|
| 9,401,834 B1 * | 7/2016 | Jamshidi | H04L 29/06326 |
| 2008/0254797 A1 * | 10/2008 | Achtari | H04W 36/0083 455/436 |
| 2012/0155445 A1 * | 6/2012 | Javaregowda | H04L 65/1069 370/338 |
| 2016/0080995 A1 * | 3/2016 | Singh | H04W 36/14 370/331 |

* cited by examiner

*Primary Examiner* — Kamran Afshar
*Assistant Examiner* — Nicole Louis-Fils

(57) ABSTRACT

A device may establish a first connection to a first radio access network (RAN) associated with a first radio access technology (RAT). The device may register to receive a call service via the first RAN. The device may receive the call service via the first connection. The device may establish a second connection to a second RAN associated with a second RAT that is different from the first RAT. The device may register to receive the call service via the second RAN. The device may compare a first signal quality metric, associated with the first connection, and a second signal quality metric associated with the second connection. The device may cause the call service to be transferred from the first connection to the second connection, based on comparing the first signal quality metric and the second signal quality metric, without causing an interruption to the call service.

20 Claims, 7 Drawing Sheets

SOFT HANDOVER FOR A VOICE OVER INTERNET PROTOCOL SERVICE

BACKGROUND

A client device may receive a call service via a particular radio access network. For example, the client device may receive the call service via a long term evolution (LTE) connection, a Wi-Fi connection, a high speed packet access (HSPA) connection, or the like. Packets associated with the call service may be routed to the client device based on an Internet protocol (IP) address assigned to the client device for the particular radio access network. When a signal quality associated with the particular radio access network fails to satisfy a signal quality threshold, the client device may disconnect from the particular radio access network and may connect to another radio access network.

DETAILED DESCRIPTION OF PREFERRED EMBODIMENTS

The following detailed description of example implementations refers to the accompanying drawings. The same reference numbers in different drawings may identify the same or similar elements.

A client device may connect to a first radio access network (RAN) associated with a first radio access technology (RAT) to receive a call service. For example, the client device may connect to a base station associated with providing a long term evolution (LTE) network connection to perform a voice over Internet protocol (VoIP) call with another client device. The client device may be assigned a first Internet protocol (IP) address for the LTE network connection. Packets may be routed, via the base station and the LTE network, to the client device based on the first IP address. Based on a signal quality, such as a signal strength, an amount of jitter, a packet loss, an amount of throughput, or the like, satisfying a signal quality threshold, the client device may disconnect from the first RAN associated with the first RAT, and may connect to a second RAN (e.g., a Wi-Fi network) associated with a second RAT to receive the call service. For example, the client device may disconnect from the LTE network connection and may establish a Wi-Fi network connection associated with a second IP address.

However, based on disconnecting from the first network connection associated with the first IP address and connecting to the second network connection associated with the second IP address, the client device may experience an interruption to the call service. For example, a call may be dropped, a quantity of packets may be lost (e.g., causing a period of the call to be lost), or the like. Implementations, described herein, may establish the second network connection before triggering a transfer from the first network connection. In this way, the client device may reduce a likelihood of a call interruption (e.g., one or more dropped packets or a dropped call), reduce a period of time associated with a transfer, or the like, relative to establishing the second network connection when the transfer is required. Moreover, based on performing signaling associated with establishing the second network connection prior to a signal quality of the first network connection satisfying a signal quality threshold associated with reduced network performance, the client device may reduce a likelihood that network traffic, associated with the signaling, is dropped and required to be resent, thereby reducing a quantity of signals transmitted relative to establishing the second network connection after the signal quality satisfies the signal quality threshold.

Figure 1A:
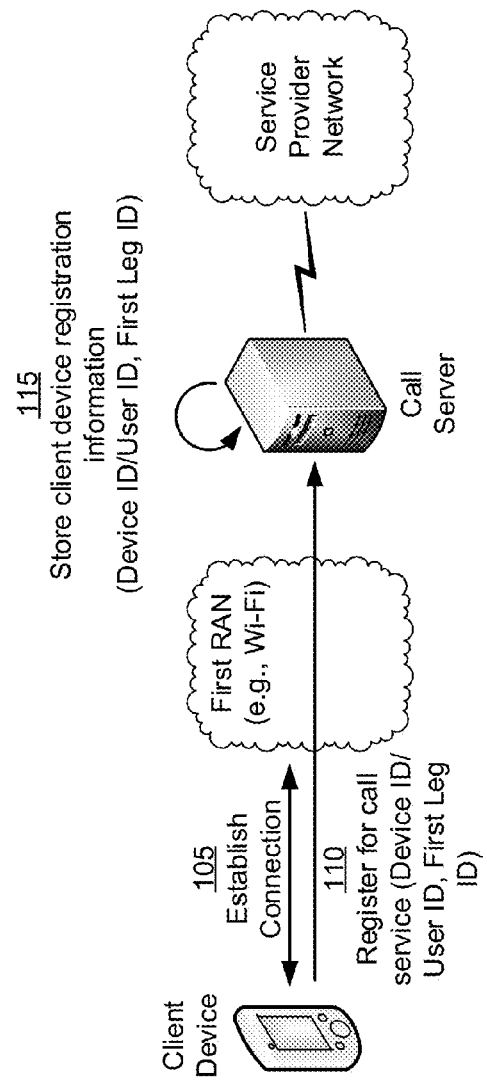
FIGS. 1A-1D are diagrams of an overview of an example implementation described herein.

FIGS. 1A-1D are diagrams of an overview of an example implementation 100 described herein. As shown in FIG. 1A, example implementation 100 may include a client device and a call server. As shown by reference number 105, the client device may establish a connection to a first RAN (e.g., a Wi-Fi RAN). As shown by reference number 110, based on establishing the connection, the client device may register with the call server to receive a call service via the first RAN (e.g., a VoIP service). For example, the client device may provide client device registration information identifying the client device (e.g., a device identifier), a user of the client device (e.g., a user identifier), a leg of the connection (e.g., a leg identifier), or the like.

The leg of the connection may refer to a particular connection to the service provider network (e.g., via which the client device may communicate with the call server), of a set of connections to the service provider network, via a particular RAN, of a set of RANs. For example, when the client device is connected to the service provider network via a first RAN and a second RAN, a connection via the first RAN may be termed a first leg of the connection and a connection via the second RAN may be termed a second leg of the connection. As shown by reference number 115, the call server may store the client device registration information (e.g., the device identifier, the user identifier, the first leg identifier, or the like) based on the client device registering to receive the call service via the first RAN.

Figure 1B:
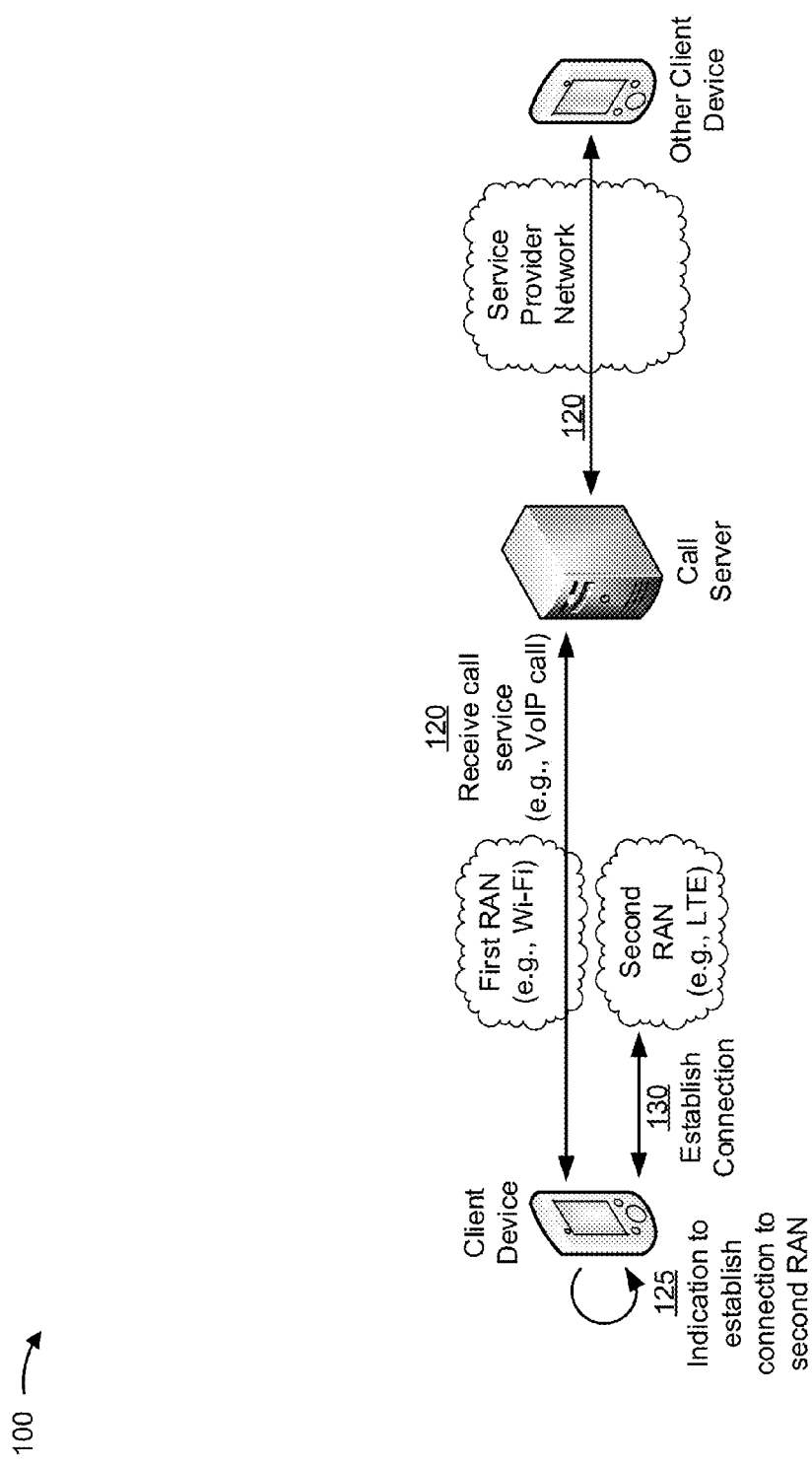

As shown in FIG. 1B, and by reference number 120, the client device may receive the call service (e.g., receive a VoIP call from another client device) via the service provider network, the call server, and the first RAN. As shown by reference number 125, after a period of time, the client device may receive an indication to establish a connection to a second RAN. For example, the client device may determine that a signal quality metric satisfies a signal quality threshold associated with reduced network performance. As shown by reference number 130, based on receiving the indication, the client device may establish the connection to the second RAN (e.g., an LTE RAN).

Figure 1C:
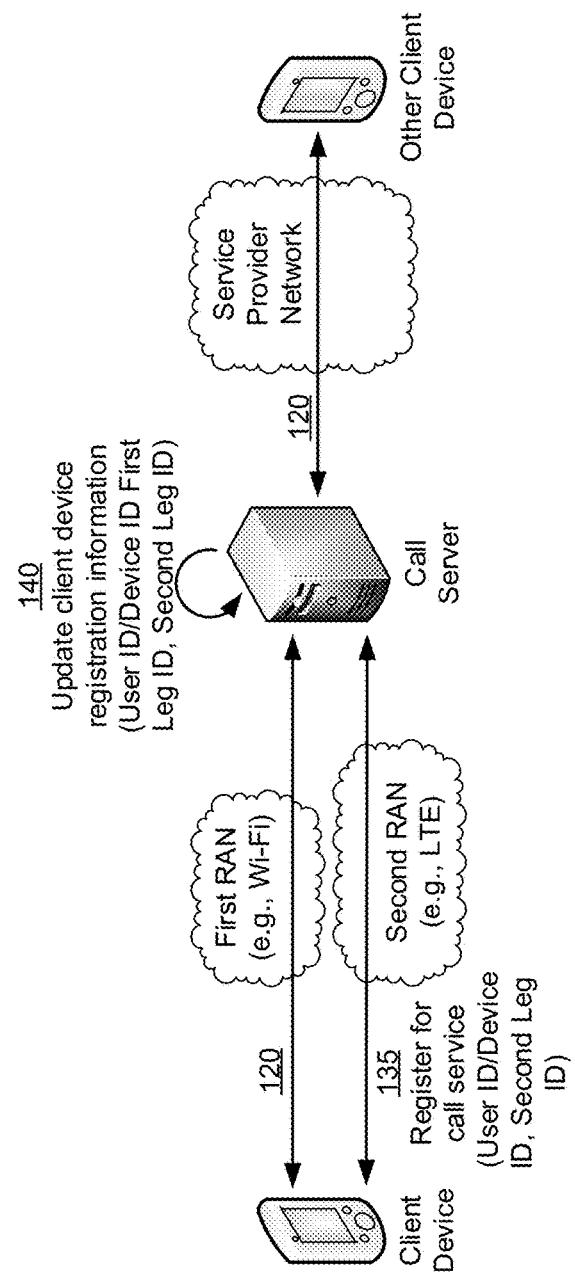

As shown in FIG. 1C, and by reference number 135, based on establishing the connection to the second RAN, the client device may register with the call server to receive the call service via the second RAN. For example, the client device may provide client device registration information, such as the user identifier, the device identifier, and a second leg identifier associated with the connection to the second RAN. As shown by reference number 140, the call server may receive the client device registration information, determine (e.g., based on the user identifier and/or the device identifier) that the client device is the same as the client device registered to receive the call service via the first RAN), and may update the stored client device registration information to include the second leg identifier. In this way, the call server is caused to store information associated with transferring packet routing from routing via the first RAN to routing via the second RAN.

Figure 1D:
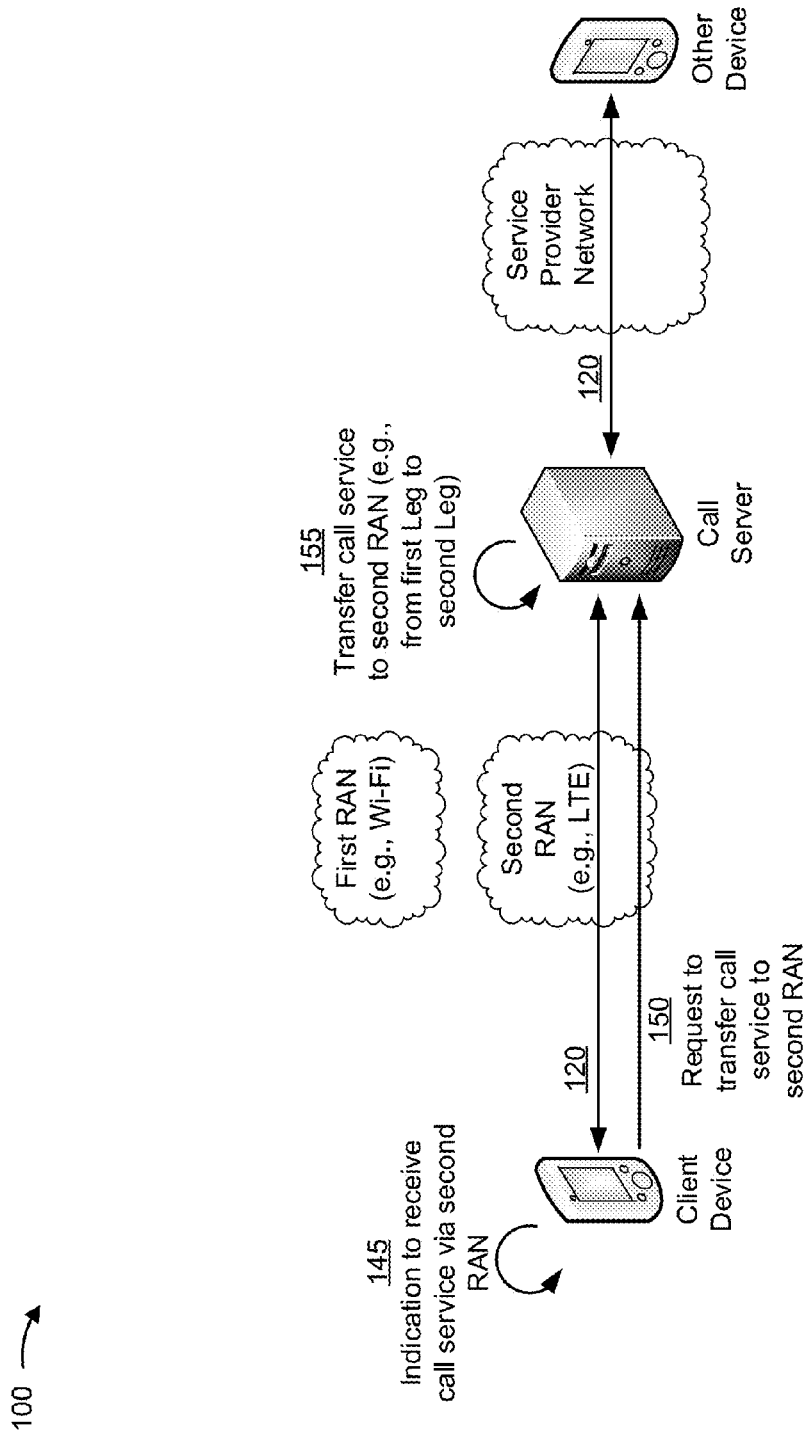

As shown in FIG. 1D, and by reference number 145, the client device may receive an indication to receive the call service via the second RAN. For example, the client device may determine that the connection to the first RAN is undergoing an imminent failure (e.g., a significant reduction in signal quality). As shown by reference number 150, the client device may request that the call server transfer the call service to the second leg (e.g., direct packets to the second RAN). As shown by reference number 155, the call server is caused to transfer the call service to the second RAN (e.g., from the first leg to the second leg). Based on the connection to the second RAN being established prior to the request, the call service is transferred without an interruption to the call service (e.g., without the user of the client device experiencing a pause longer than, for example, one second or a dropped call in the VoIP call with the other client device), despite the client device being associated with a first IP address for routing packets via the first leg and a second IP address for routing packets via the second leg. For example, the call server may cause packets of the VoIP call to be routed via a bearer already established for the second RAN, rather than the packets being dropped until the bearer is established.

In this way, the client device establishes a second connection for a call service prior to detecting a trigger to transfer from a first connection to the second connection, thereby reducing an interruption associated with transferring from the first connection to the second connection without the second connection being already established. Moreover, based on establishing the second connection prior to the signal quality satisfying a signal quality threshold associated with reduced network performance, the client device may reduce a likelihood of dropped signaling messages, thereby reducing network traffic associated with establishing and transferring to the second connection.

As indicated above, FIGS. 1A-1D are provided merely as an example. Other examples are possible and may differ from what was described with regard to FIGS. 1A-1D.

Figure 2:
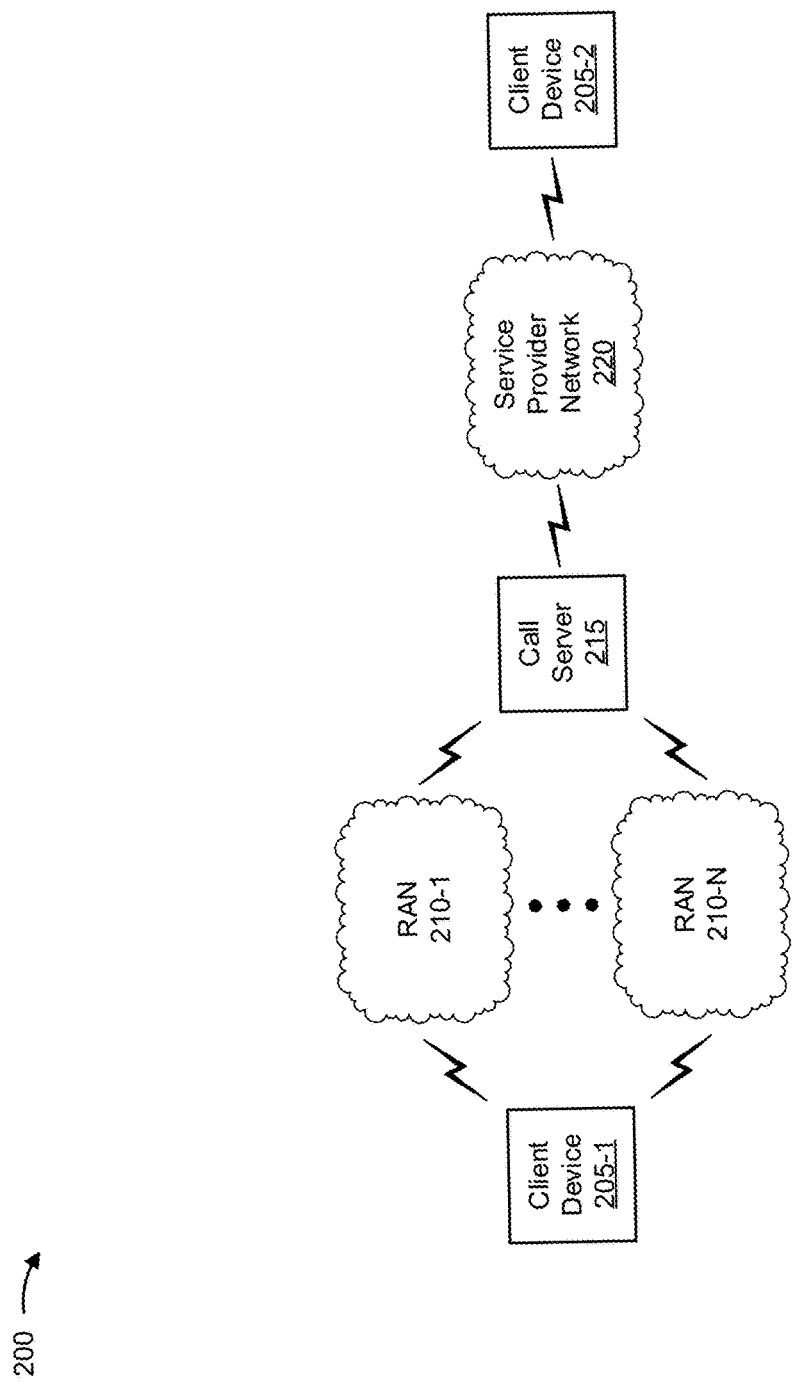
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 205-1 through 205-2 (hereinafter referred to collectively as "client devices 205," and individually as "client device 205"), one or more RANs 210-1 through 210-N (hereinafter referred to collectively as "RANs 210," and individually as "RAN 210"), a call server 215, and a service provider network 220. Devices of environment 200 may interconnect via wired connections, wireless connections, or a combination of wired and wireless connections.

Client device 205 includes one or more devices capable of receiving, generating, storing, processing, and/or providing information associated with a call service. For example, client device 205 may include a communication and computing device, such as a mobile phone (e.g., a smart phone or a radiotelephone), a user device, a laptop computer, a tablet computer, a handheld computer, a gaming device, a wearable communication device (e.g., a smart wristwatch or a pair of smart eyeglasses), or a similar type of device. In some implementations, client device 205 may store or have access to an over-the-top (OTT) application associated with the call service, such as an application hosted by call server 215. In some implementations, client device 205 may receive information from and/or transmit information to another device in environment 200.

RAN 210 includes one or more wireless networks. For example, RAN 210 may include a cellular network (e.g., a long-term evolution (LTE) network or a high speed packet access (HSPA) network), a wireless local area network (LAN) (e.g., a Wi-Fi network), or the like. Additionally, or alternatively, RAN 210 may include another type of network (e.g., one or more wired and/or wireless networks), such as another type of cellular network (e.g., a 3G network or a code division multiple access network (CDMA) network), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, RAN 210 may include one or more devices, such as a base station, an access point (e.g., a Wi-Fi access point), or the like.

Call server 215 includes one or more devices capable of receiving, generating, storing, processing, and/or providing information associated with a call service, such as a VoIP call service. For example, call server 215 may include a server that directs routing of packets between RAN 210 and service provider network 220. In some implementations, call server 215 may transfer routing of packets from routing via a first RAN 210 to routing via a second RAN 210. In some implementations, the call service may provided by an OTT application hosted by call server 215. In some implementations, call server 215 may receive information from and/or transmit information to another device in environment 200.

Service provider network 220 includes one or more wired and/or wireless networks and/or one or more devices thereof. For example, service provider network 220 may include a cellular network (e.g., an LTE network, a 3G network, or a CDMA network), a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
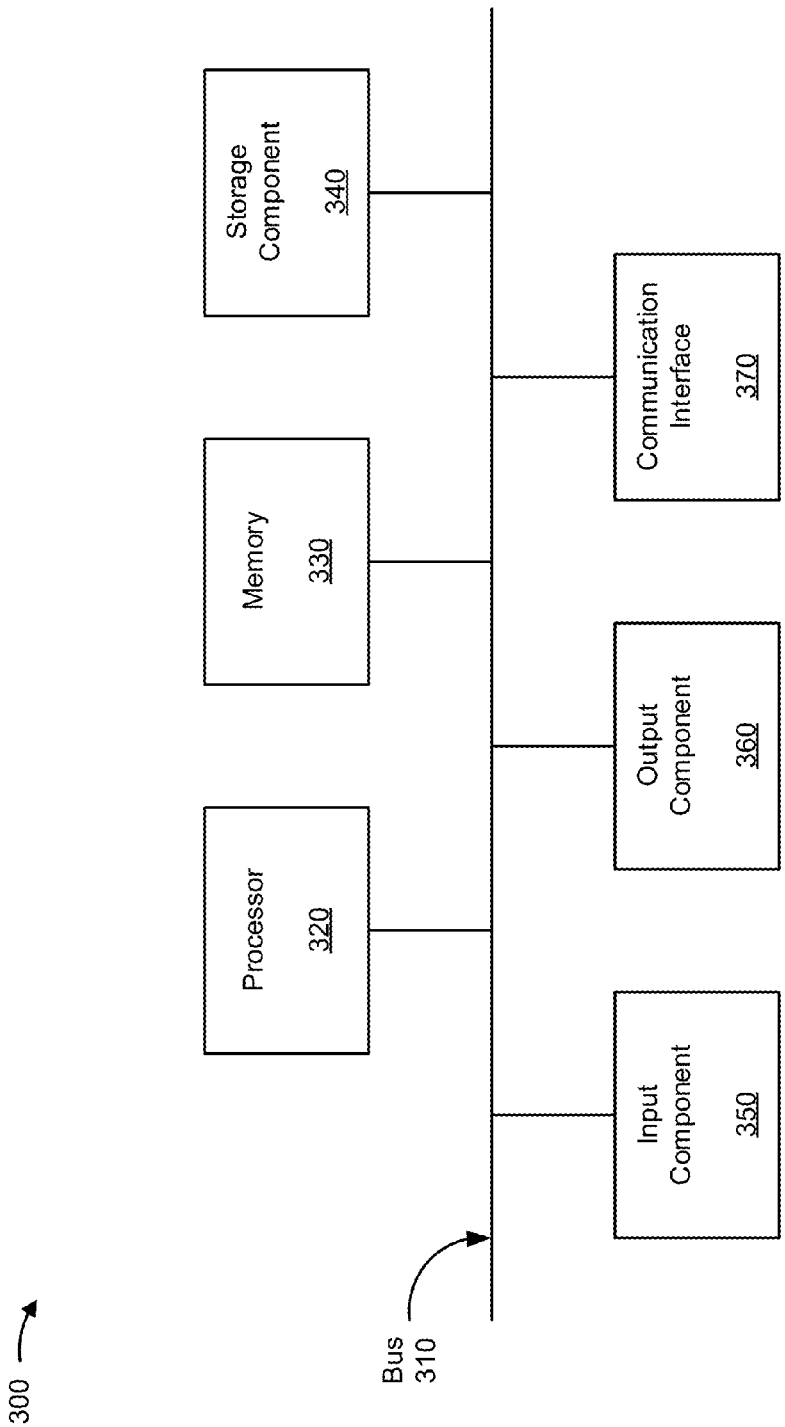
FIG. 3 is a diagram of example components of one or more devices of FIG. 2.

FIG. 3 is a diagram of example components of a device 300. Device 300 may correspond to client device 205 and/or call server 215. In some implementations, client device 205 and/or call server 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 may include a processor (e.g., a central processing unit (CPU), a graphics processing unit (GPU), or an accelerated processing unit (APU)), a microprocessor, and/or any processing component (e.g., a field-programmable gate array (FPGA) or an application-specific integrated circuit (ASIC)) that interprets and/or executes instructions. In some implementations, processor 320 may include one or more processors capable of being programmed to perform a function. Memory 330 includes a random access memory (RAM), a read only memory (ROM), and/or another type of dynamic or static storage device (e.g., a flash memory, a magnetic memory, or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, or a microphone). Additionally, or alternatively, input component 350 may include a sensor for sensing information (e.g., a global positioning system (GPS) component, an accelerometer, a gyroscope, or an actuator). Output component 360 includes a component that provides output information from device 300 (e.g., a display, a speaker, or one or more light-emitting diodes (LEDs)).

Communication interface 370 includes a transceiver-like component (e.g., a transceiver, or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
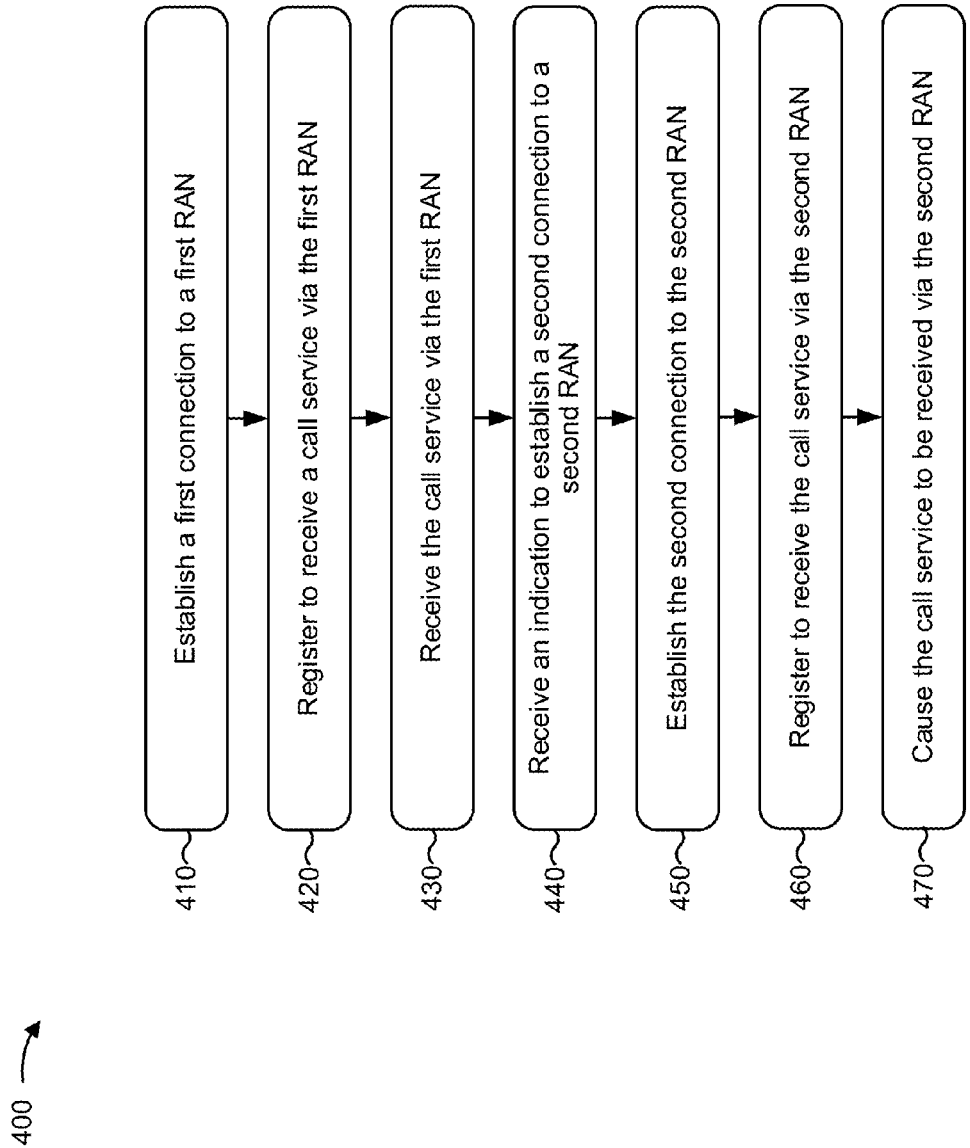
FIG. 4 is a flow chart of an example process for establishing a connection to multiple radio access networks to reduce a likelihood of an interruption to a call service.

FIG. 4 is a flow chart of an example process 400 for establishing a connection to multiple radio access networks to reduce a likelihood of an interruption to a call service. In some implementations, one or more process blocks of FIG. 4 may be performed by client device 205. In some implementations, one or more process blocks of FIG. 4 may be performed by another device or a group of devices separate from or including client device 205, such as call server 215 or the like.

As shown in FIG. 4, process 400 may include establishing a first connection to a first RAN (block 410). For example, client device 205 may establish a first connection to first RAN 210. In some implementations, client device 205 may establish the first connection based on determining that first RAN 210 is available for the first connection. For example, client device 205 may activate a radio of client device 205, and may detect first RAN 210 via the radio. In this case, client device 205 may exchange signals with one or more devices of first RAN 210 (e.g., a base station, an access point, or the like) to establish the first connection, cause a set of network resources (e.g., a quantity of bandwidth or one or more bearers) to be allocated to client device 205, or the like. Additionally, or alternatively, client device 205 may establish the first connection based on a user interaction with a user interface. For example, based on detecting the user interaction with the user interface, client device 205 may be caused to establish the first connection.

In some implementations, client device 205 may select first RAN 210 from a set of RANs 210 associated with a set of RATs. For example, client device 205 may detect a Wi-Fi RAN 210, an LTE RAN 210, an HSPA RAN 210, or the like, and may select the Wi-Fi RAN 210 based on a prioritization of types of RATs. Additionally, or alternatively, client device 205 may select first RAN 210 based on a characteristic of first RAN 210. For example, client device 205 may determine a signal quality metric for one or more signals associated with one or more RANs 210, and may select first RAN 210 based on a particular signal quality metric for first RAN 210 exceeding one or more other signal quality metrics corresponding to one or more other RANs 210. Additionally, or alternatively, client device 205 may select first RAN 210 based on a signal quality metric for first RAN 210 satisfying a signal quality threshold. For example, client device 205 may select first RAN 210 based on determining that a signal strength associated with first RAN 210 satisfies a signal strength threshold, and may establish the first connection with first RAN 210 based on selecting first RAN 210.

As further shown in FIG. 4, process 400 may include registering to receive a call service via the first RAN (block 420). For example, client device 205 may register to receive a call service via first RAN 210. A call service may refer to a service associated with sending and/or receiving a call via service provider network 220 (e.g., a call with another client device 205 connected to service provider network 220). For example, client device 205 may register to receive a VoIP service, a multimedia call service, or another type of call service provided via a packet-based network (i.e., a packet-based call service). In some implementations, the call service may be associated with an OTT application hosted by caller server 215. In such a case, client device 205 may store or have access to the OTT application in order to register for the call service and receive the call service. For example, the OTT application may be embedded on client device 205 and/or downloaded by client device 205.

In some implementations, client device 205 may register with call server 215 for the call service. For example, call server 215 may provide a calling application associated with providing the call service, and client device 205 may receive and store the calling application for utilization in accessing the call service. In this case, based on receiving and storing the calling application, client device 205 may communicate with call server 215 to register client device 205 for the call service via first RAN 210. In some implementations, client device 205 may provide information via a particular protocol to register to receive the call service. For example, client device 205 may communicate with call server 215 via a particular protocol, such as via a set of session initiation protocol (SIP) messages or the like.

In some implementations, client device 205 may register to receive the call service via first RAN 210 based on establishing the first connection to first RAN 210. For example, client device 205 may establish the first connection to first RAN 210, and may automatically register to receive the call service via first RAN 210. Additionally, or alternatively, client device 205 may register to receive the call service based on activating the calling application associated with call server 215. For example, when the calling application is executed via client device 205 (e.g., automatically or based on detecting a user interaction), client device 205 may be caused to register to receive the call service via first RAN 210. Additionally, or alternatively, client device 205 may register to receive the call service based on an attempt to place a call. For example, client device 205 may detect a user interaction associated with causing client device 205 to place a VoIP call via first RAN 210, and may be caused to register to receive the call service via first RAN 210, thereby permitting client device 205 to place the VoIP call via first RAN 210.

In some implementations, client device 205 may provide client device registration information to call server 215 to register client device 205 for the call service via first RAN 210. For example, client device 205 may provide a public identifier associated with client device 205. The public identifier may include information associated with identifying client device 205 (e.g., a device identifier, a mobile device number (MDN), or an international subscriber mobile identity (IMSI)), information associated with identifying a user of client device 205 (e.g., a user identifier, a user name, or an account number), or the like.

Additionally, or alternatively, client device 205 may provide a private identifier associated with client device 205 to call server 215 to register client device 205 for the call service via first RAN 210. The private identifier may include information (e.g., a string of characters) associated with identifying a leg of a connection to service provider network 220. For example, client device 205 may generate and provide a first private identifier identifying the first leg of the connection that utilizes first RAN 210. Additionally, or alternatively, client device 205 may generate and provide a second private identifier identifying a second leg of the connection that utilizes a second RAN 210 when registering to receive the call service via the second RAN 210, a third private identifier identifying a third leg of the connection that utilizes a third RAN 210 when registering to receive the call service via the third RAN 210, or the like. In this way, client device 205 provides information to call server 215 to permit call server 215 to direct packets associated with the call service to client device 205.

As further shown in FIG. 4, process 400 may include receiving the call service via the first RAN (block 430). For example, client device 205 may receive the call service via first RAN 210. In some implementations, client device 205 may initiate a call via the call service. For example, when client device 205 receives the call service via first RAN 210, client device 205 is permitted to initiate a VoIP call via the call service. Similarly, client device 205 may receive the VoIP call via the call service (rather than initiate the VoIP call). In some implementations, client device 205 may receive a call identifier that may be subsequently provided to call server 215 to permit call server 215 to transfer the VoIP call from the call service via first RAN 210 to a call service via a second RAN 210, as described below.

As further shown in FIG. 4, process 400 may include receiving an indication to establish a second connection to a second RAN (block 440). For example, client device 205 may receive an indication to establish a second connection to second RAN 210. In some implementations, client device 205 may receive the indication based on determining a signal quality metric associated with the first connection to first RAN 210, such as a signal strength metric, a jitter metric, a packet loss metric, a throughput metric, an interference level metric, or the like. For example, client device 205 may determine that a signal strength associated with the first connection to first RAN 210 satisfies a first signal strength threshold associated with reduced network performance, and may determine to establish the second connection to second RAN 210. In this case, client device 205 may establish the second connection to second RAN 210 prior to the signal strength satisfying a second signal strength threshold associated with a call via the first connection being dropped, thereby ensuring that client device 205 is prepared to transfer to the second connection if the signal strength subsequently satisfies the second signal strength threshold.

Additionally, or alternatively, client device 205 may receive the indication based on a network traffic metric associated with the connection to first RAN 210. For example, client device 205 may receive information indicating that a network traffic level, a congestion level, or the like satisfies a threshold level associated with reduced network performance, and may determine to establish the second connection to second RAN 210. Additionally, or alternatively, client device 205 may receive the indication based on detecting a user interaction with a user interface. For example, client device 205 may detect a user interaction associated with causing client device 205 to establish the second connection to second RAN 210.

In some implementations, client device 205 may receive the indication to establish the second connection to second RAN 210 based on determining that second RAN 210 is available to establish the second connection. For example, when connected to first RAN 210, client device 205 may detect that second RAN 210 is available, and may determine to establish the second connection to second RAN 210. Additionally, or alternatively, client device 205 may detect that second RAN 210 is available and may receive the indication to establish the second connection to second RAN 210 concurrent to establishing the first connection to first RAN 210. In this case, client device 205 may establish both the first connection to first RAN 210 and the second connection to second RAN 210 concurrently or within a threshold period of time of each other. For example, client device 205 may establish the first connection, register the first leg, establish the second connection, and register the second leg prior to receiving the call service via the first connection. In this way, client device 205 establishes the second connection to second RAN 210 prior to detecting a trigger associated with causing client device 205 to transfer from first RAN 210 to second RAN 210.

Additionally, or alternatively, client device 205 may receive the indication to establish the second connection to second RAN 210 based on a metric (e.g., a signal quality metric, a network traffic metric) associated with second RAN 210. For example, client device 205 may determine that the metric satisfies a threshold (e.g., a threshold associated with an improved performance), and may establish the second connection to second RAN 210.

Additionally, or alternatively, client device 205 may receive the indication to establish the second connection based on a metric associated with first RAN 210 and a metric associated with second RAN 210. For example, client device 205 may determine a first signal strength associated with first RAN 210 and a second signal strength associated with second RAN 210. Here, client device 205 may compare the first signal strength and the second signal strength, and may receive the indication to establish the second connection when, for example, the second signal strength matches the first signal strength (e.g., within a threshold amount), the second signal strength exceeds the first signal strength (e.g., by a threshold amount), the first signal strength is lower than the second signal strength (e.g., by a threshold amount), or the like.

As further shown in FIG. 4, process 400 may include establishing the second connection to the second RAN (block 450). For example, client device 205 may establish the second connection to second RAN 210. In this case, client device 205 may exchange signals with one or more devices of second RAN 210 (e.g., a base station, an access point, or the like) to establish the second connection, cause a set of network resources (e.g., a quantity of bandwidth or one or more bearers) to be allocated to client device 205, or the like. In this way, client device 205 reduces a quantity of time associated with transferring from first RAN 210 to second RAN 210 relative to triggering a transfer prior to the set of network resources being allocated.

In some implementations, client device 205 may establish multiple connections to multiple RANs 210. For example, client device 205 may establish a second connection via a second RAN 210 (e.g., an LTE connection) and a third connection via a third RAN 210 (e.g., an HSPA connection). In this case, client device 205 may utilize the second connection or the third connection when transferring from the first connection to first RAN 210. In this way, client device 205 reduces a likelihood that a network failure associated with multiple RANs (e.g., first RAN 210 and second RAN 210) results in a dropped call for client device 205 (e.g., based on permitting client device 205 to transfer to third RAN 210 or the like).

As further shown in FIG. 4, process 400 may include registering to receive the call service via the second RAN (block 460). For example, client device 205 registers to receive the call service via second RAN 210. In some implementations, client device 205 registers to receive the call service prior to losing access to the call service via the first connection to first RAN 210. For example, while maintaining the call service via the first connection to first RAN 210, client device 205 registers to receive the call service via the second connection to second RAN 210. In this way, client device 205 reduces a likelihood of a dropped call and/or a duration of a call outage relative to registering to receive the call service via second RAN 210 after losing access to the call service via first RAN 210. As another example, client device 205 may register to receive the call service via the second connection to the second RAN 210 before client device 205 receives the call service (e.g., when client device 205 is not involved in a call with another client device 205). In some implementations, client device 205 may (e.g., automatically) register to receive the call service via second RAN 210 based on establishing the second connection.

Additionally, or alternatively, client device 205 may register to receive the call service via second RAN 210 based on a metric associated with the first connection to first RAN 210. For example, client device 205 may determine that the metric satisfies a threshold (e.g., a threshold associated with reduced performance), and may register to receive the call service via second RAN 210.

Additionally, or alternatively, client device 205 may register to receive the call service via second RAN 210 based on a metric associated with second RAN 210. For example, client device 205 may determine that the metric satisfies a threshold (e.g., a threshold associated with an improved performance), and may register to receive the call service via second RAN 210.

Additionally, or alternatively, client device 205 may register to receive the call service via second RAN 210 based on a metric associated with first RAN 210 and a metric associated with second RAN 210. For example, client device 205 may determine a first throughput metric associated with first RAN 210 and a second throughput metric associated with second RAN 210. Here, client device 205 may compare the first throughput metric and the second throughput metric, and may register to receive the call service via second RAN 210 when, for example, the second throughput metric matches the first throughput metric (e.g., within a threshold amount), the second throughput metric exceeds the first throughput metric (e.g., by a threshold amount), the first throughput metric is less than the second throughput metric (e.g., by a threshold amount), or the like.

In some implementations, client device 205 provides client device registration information to register to receive the call service via second RAN 210. For example, client device 205 may provide, to call server 215, a public identifier associated with client device 205 and a private identifier associated with a second leg (e.g., the second connection to second RAN 210). In this case, call server 215 may be caused to identify client device 205 based on the public identifier, and store information identifying the second leg (e.g., the second private identifier). In this way, call server 215 stores information identifying each leg for the call service associated with client device 205 (e.g., a first private identifier for the first leg associated with the first connection to first RAN 210 and a second private identifier for the second leg associated with the second connection to second RAN 210). Moreover, storing the information permits call server 215 to seamlessly transfer from providing the call service via the first leg to providing the call service via the second leg without a dropped call or a call outage, thereby improving network performance relative to requiring call server 215 to obtain information identifying the second leg after a connection via the first leg is dropped.

As further shown in FIG. 4, process 400 may include causing the call service to be received via the second RAN (block 470). For example, client device 205 may cause the call service to be received via second RAN 210. In some implementations, client device 205 may cause the call to be received via second RAN 210 based on detecting that the first connection to first RAN 210 is lost. For example, based on detecting an interruption to the first connection to first RAN 210, client device 205 may cause the call service to be transferred to being received via second RAN 210. In this way, based on establishing the second connection to second RAN 210 prior to the first connection to first RAN 210 being lost, client device 205 reduces a likelihood of a call outage relative to being required to establish the second connection to second RAN 210 after the first connection to first RAN 210 is lost.

In some implementations, client device 205 may cause the call to be received via second RAN 210 based on detecting that a signal quality metric associated with the first connection to first RAN 210 satisfies a signal quality threshold. For example, client device 205 may determine that a signal strength of the first connection satisfies a signal strength threshold associated with reduced network performance, and client device 205 may cause the call to be received the second connection to the second RAN 210. In this way, client device 205 improves network performance relative to permitting the call service to remain via the first connection to first RAN 210. Moreover, client device 205 reduces a likelihood of a call outage relative to establishing the second connection to second RAN 210 after the detecting that the first connection to first RAN 210 is lost.

Additionally, or alternatively, client device 205 may cause the call service to be received via second RAN 210 when a signal quality metric associated with second RAN 210 exceeds a signal quality metric associated with first RAN 210. For example, client device 205 may determine that a throughput associated with the second connection to second RAN 210 exceeds a throughput associated with the first connection to first RAN 210, and may cause the call service to be received via second RAN 210, thereby improving throughput for the call service and reducing a likelihood of a call outage occurring relative to remaining connected to first RAN 210. Additionally, or alternatively, client device 205 may cause the call service to be received via second RAN 210 when the signal quality metric associated with second RAN 210 satisfies a threshold (e.g., a threshold associated with an improved performance).

Additionally, or alternatively, client device 205 may cause the call service to be received via second RAN 210 based on a metric associated with first RAN 210 and a metric associated with second RAN 210. For example, client device 205 may determine a first packet loss metric associated with first RAN 210 and a second packet loss metric associated with second RAN 210. Here, client device 205 may compare the first packet loss metric and the second packet loss metric, and may cause the call service to be received via second RAN 210 when, for example, the second packet loss metric matches the first packet loss metric (e.g., within a threshold amount), the second packet loss metric exceeds the first packet loss metric (e.g., by a threshold amount), the first packet loss metric is less than the second packet loss metric (e.g., by a threshold amount), or the like.

In some implementations, client device 205 may be configured such that receipt of the call service is preferred via a particular RAT and/or RAN 210. For example, client device 205 may be configured such that a first RAT is preferred over a second RAT. As a particular example, client device 205 may be configured to cause the call service to be transferred from first RAN 210 (e.g., an LTE RAN) to second RAN 210 (e.g., a Wi-Fi RAN) only when a signal quality metric associated with first RAN 210 satisfies a threshold (e.g., associated with a reduced performance), and may be configured to cause the call service to be transferred from second RAN 210 back to first RAN 210 when, for example, the signal quality metric does not satisfy the threshold (i.e., when performance improves), regardless of any metric associated with second RAN 210.

In some implementations, client device 205 may cause the call service to be received via first RAN 210 after causing the call service to be received via second RAN 210, in a manner similar to that described above (i.e., client device 205 may cause the call service to be transferred from second RAN 210 back to first RAN 210). In such case, a first threshold, associated with causing the call service to be received via second RAN 210, may differ from a second threshold, associated with causing the call service to be transferred back to first RAN 210, by particular amount (e.g., a hysteresis window). This may prevent repeated transferring of the call service between first RAN 210 and second RAN 210 and/or waste of device and/or network resources.

In some implementations, client device 205 may cause the call service to be received via second RAN 210 based on transmitting a request to call server 215. For example, client device 205 may transmit signaling via a particular protocol (e.g., a set of SIP messages), and may provide information, such as a public identifier associated with client device 205, a private identifier associated with the second leg (e.g., the second connection to second RAN 210), a call identifier associated with a call via the call service, or the like. In this case, based on receiving the signaling and/or the information, call server 215 may cause the call service to be received via second RAN 210. For example, call server 215 may cause packets of the call, identified by the call identifier, to be transferred from being transmitted toward an IP address associated with the first connection to first RAN 210 to another IP address associated with the second connection to second RAN 210 (e.g., identified by the public identifier and the private identifier). In this way, client device 205 causes the call service and/or a call via the call service to be transferred from the first connection to first RAN 210 to the second connection to second RAN 210 without causing a dropped call or a call outage.

In some implementations, client device 205 may cause the call service to be received via second RAN 210 without causing the call service to be dropped from first RAN 210. For example, client device 205 may cause a first portion of packets of a call to be transmitted via first RAN 210 and a second portion of the packets of the call to be transmitted via second RAN 210. In this way, client device 205 may relieve congestion via first RAN 210. Additionally, or alternatively, client device 205 may cause packets to be duplicated via first RAN 210 and second RAN 210. For example, client device 205 may utilize the second connection to second RAN 210 to exchange redundant packets for the call service (e.g., such that redundant packets are simultaneously provided via the first RAN 210 and the second RAN 210), thereby reducing a likelihood of packets being dropped from the call service and improving network performance relative to providing the packets via first RAN 210 without redundancy. In this case, client device 205 and/or call server 215 may compare packets received via the first connection to first RAN 210 and the second connection to second RAN 210 to ensure that lost packets are replaced with redundant packets to the lost packets.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, or a position of information provided via the user interface). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, or a combination of related and unrelated items), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more processors to:
        establish a first connection to a first radio access network (RAN),
            the first RAN being associated with a first radio access technology (RAT);
        store or access an over-the-top (OTT) application;
        register, based on storing or accessing the OTT application, to receive a call service via the first RAN based on establishing the first connection;
        receive the call service via the first connection;
        establish a second connection to a second RAN concurrently or within a threshold period of time of establishing the first connection,
            the second RAN being associated with a second RAT that is different from the first RAT, and
            the second connection being established prior to a signal strength, of the call service, satisfying a signal strength threshold associated with the call service being dropped;
        register to receive the call service via the second RAN based on establishing the second connection;
        compare a first signal quality metric, associated with the first connection, and a second signal quality metric associated with the second connection; and
        cause the call service to be transferred from the first connection to the second connection based on comparing the first signal quality metric and the second signal quality metric,
            the call service being transferred from the first connection to the second connection without causing an interruption to the call service.

2. The device of claim 1, where the one or more processors are further to:
    determine that a third signal quality metric, associated with the first connection to the first RAN, satisfies a signal quality threshold; and
    where the one or more processors, when establishing the second connection to the second RAN, are to:
        establish the second connection to the second RAN based on determining that the third signal quality metric satisfies the signal quality threshold.

3. The device of claim 1, where the one or more processors are further to:
    compare a third signal quality metric, associated with the first connection to the first RAN, and a fourth signal quality metric associated with the second connection to the second RAN; and where the one or more processors, when establishing the second connection to the second RAN, are to:
establish the second connection to the second RAN based on comparing the third signal quality metric and the fourth signal quality metric.

4. The device of claim 1, where the one or more processors are further to:
receive a call identifier associated with receiving the call service; and
determine a leg identifier associated with the second connection; and
where the one or more processors, when causing the call service to be transferred from the first connection to the second connection, are to:
provide the call identifier and the leg identifier to a call server associated with transferring the call service.

5. The device of claim 1, where the device establishes the first connection and establishes the second connection before receiving the call service.

6. The device of claim 1, where the one or more processors are further to:
establish a third connection to a third RAN,
the third RAN being associated with a third RAT that is different from the second RAT;
register to receive the call service via the third RAN based on establishing the third connection; and
cause the call service to be transferred from the second connection to the third connection,
the call service being transferred from the second connection to the third connection without causing an interruption to the call service.

7. The device of claim 1, where the first RAN and the second RAN include a wireless local area network and a long term evolution (LTE) network.

8. A method, comprising:
establishing, by a device, a first connection to a first radio access network (RAN),
the first RAN being associated with a first radio access technology (RAT);
storing or accessing, by the device, an over-the-top (OTT) application;
registering, by the device and based on storing or accessing the OTT application, to receive a call service via the first RAN based on establishing the first connection;
participating, by the device, in a call, associated with the call service, via the first connection;
establishing, by the device, a second connection to a second RAN concurrently or within a threshold period of time of establishing the first connection,
the second RAN being associated with a second RAT that is different from the first RAT, and
the second connection being established prior to a signal strength, of the call service, satisfying a signal strength threshold associated with the call service being dropped;
registering, by the device, to receive the call service via the second RAN based on establishing the second connection;
determining, by the device, a signal quality metric associated with the first connection to the first RAN; and
causing, by the device, the call to be transferred from the first connection to the second connection based on the signal quality metric associated with the first connection,
the call being transferred from the first connection to the second connection while maintaining participation in the call.

9. The method of claim 8, further comprising:
determining that another signal quality metric, associated with the first connection to the first RAN, satisfies a signal quality metric threshold; and
where registering to receive the call service via the second RAN comprises:
registering to receive the call service via the second RAN based on determining that the other signal quality metric satisfies the signal quality metric threshold.

10. The method of claim 8, further comprising:
determining a signal quality metric associated with the second connection to the first RAN;
comparing the signal quality metric, associated with the first connection to the first RAN, and the signal quality metric associated with the second connection to the second RAN; and
where causing the call to be transferred from the first connection to the second connection comprises:
causing the call to be transferred based on comparing the signal quality metric, associated with the first connection, and the signal quality metric associated with the second connection.

11. The method of claim 8, further comprising:
determining a leg identifier associated with the second connection; and
where causing the call to be transferred from the first connection to the second connection comprises:
providing the leg identifier to a call server associated with the call service.

12. The method of claim 8, where the device establishes the first connection before participating in the call and establishes the second connection concurrently with participating in the call.

13. The method of claim 8, where, after causing the call to be transferred from the first connection to the second connection, the method further comprises:
causing the call to be transferred to the first connection from the second connection,
the call being transferred from the second connection to the first connection without dropping the call.

14. The method of claim 8, where the call service is a packet-based call service.

15. A device, comprising:
one or more processors to:
receive first registration information associated with a client device capable of receiving a call service,
an over-the-top (OTT) application being accessed or stored by the client device to provide the first registration information, and
the first registration information including information associated with a first connection between the client device and a first radio access network (RAN),
the first RAN being associated with a first radio access technology (RAT);
provide the call service to the client device via the first connection based on receiving the first registration information;
receive second registration information associated with the client device capable of receiving the call service,
the second registration information including information associated with a second connection between the client device and a second RAN,
the second RAN being associated with a second RAT that is different from the first RAT, the second connection being established concurrently or within a threshold period of time of establishing the first connection, and the second connection being established prior to a signal strength, of the call service, satisfying a signal strength threshold associated with the call service being dropped; and transfer the call service from the first connection to the second connection, the call service being transferred from the first connection to the second connection while maintaining provisioning of the call service.

16. The device of claim 15, where the one or more processors are further to:

receive an indication to transfer the call service from the first connection to the second connection, the indication including an identifier associated with the second connection; and where the one or more processors, when transferring the call service from the first connection to the second connection, are to:

transfer the call service from the first connection to the second connection based on the identifier associated with the second connection.

17. The device of claim 15, where the one or more processors, when transferring the call service from the first connection to the second connection, are to:

cause packets, associated with the call service, to be routed via the second connection rather than the first connection.

18. The device of claim 15, where the one or more processors are further to:

receive third registration information associated with the client device, the third registration information including information associated with a third connection between the client device and a third RAN, the third RAN being associated with a third RAT that is different from the first RAT and the second RAT; and transfer the call service from the second connection to the third connection, the call service being transferred from the second connection to the third connection while maintaining provisioning of the call service.

19. The device of claim 15, where the first RAN includes a wireless local area network and the second RAN includes a long term evolution (LTE) network.

20. The device of claim 15, where the call service is a packet-based call service.

* * * * *